Jan. 11, 1938.   G. LAUBE ET AL   2,104,948
MOTION PICTURE CAMERA
Filed May 31, 1935   3 Sheets-Sheet 1

INVENTORS.
GROVER LAUBE.
ROBERT C. STEVENS.
CHARLES MELVIN MILLER
BY
ATTORNEY.

Jan. 11, 1938.　　　　　G. LAUBE ET AL　　　　2,104,948
MOTION PICTURE CAMERA
Filed May 31, 1935　　　　3 Sheets-Sheet 2

INVENTORS
GROVER LAUBE.
ROBERT C. STEVENS.
CHARLES MELVIN MILLER
BY
Robt. L. Gunn
ATTORNEY.

Jan. 11, 1938.  G. LAUBE ET AL  2,104,948
MOTION PICTURE CAMERA
Filed May 31, 1935   3 Sheets-Sheet 3

INVENTORS.
GROVER LAUBE
ROBERT C. STEVENS
CHARLES MELVIN MILLER
BY
ATTORNEY.

Patented Jan. 11, 1938

2,104,948

UNITED STATES PATENT OFFICE 2,104,948

MOTION PICTURE CAMERA

Grover Laube, Los Angeles, Robert Colby Stevens, Beverly Hills, and Charles Melvin Miller, Los Angeles, Calif., assignors to Fox Film Corporation, Los Angeles, Calif., a corporation of New York Application May 31, 1935, Serial No. 24,240

10 Claims. (Cl. 88—18.4)

This invention relates to cameras and deals particularly with motion picture cameras. More specifically, the invention relates to the intermittent movement of such cameras.

It is one of the objects of this invention to provide a camera of the character described wherein the camera noise has been reduced to such an extent that the camera may be used to photograph sound pictures without the use of a sound proof cabinet. In this respect it is known that the present available motion picture cameras cannot be used to photograph sound pictures without a special sound proofing arrangement to reduce camera noise. For this reason it has become common practice to enclose the camera in a sound proof cabinet. In its present development, the sound proof cabinet amounts to an unwieldy, bulky box that has become a necessary evil that places many restrictions on the art of motion picture photography. It hampers control of the camera. In close quarters it makes certain "shots" difficult. For camera crane work it is impractical to use the cabinet because of its size and weight. The cabinet also interferes with focusing and places the monitoring view finder so far away from the photographic lens that parallax becomes so pronounced as to be objectionable. Altogether, the sound proof cabinet is much to be avoided. In the camera embodied in this invention the camera noise has been reduced to such a low level that the sound proof cabinet may be eliminated and the camera used for practically all studio purposes where sound is recorded simultaneously with the picture. The advantages of this arrangement are obvious.

It is another object of this invention to provide a camera of the character described having a shutter opening of substantially 200 degrees of shutter rotation. In the development of the motion picture camera it has been found that the best results are obtained with a camera having a large shutter opening. One advantage is, that a large shutter opening increases the exposure time and permits more light to pass to the film. This is highly desirable, because with the increased light the effective lens aperture may be reduced and the depth of focus increased with a resultant better definition. Another advantage of increasing the shutter opening resides in the character of the recorded action from frame to frame. In photographing moving objects under the present system it is evident that the film is exposed to the light reflected from the object only a certain percentage of the time. Actually, only that part of the action that occurs during the exposure period is recorded. The part that occurs during the closure period is lost and may be termed the unrecorded action. By enlarging the shutter opening we decrease the amount of unrecorded action and inversely increase the amount of recorded action. In practice, this produces a more nearly complete record of the total action, decreases the displacement of the image from frame to frame and partially eliminates the jerky motion on the screen.

In general, an intermittent film movement may be divided into three functions, namely, the film engaging movement of the take-down member whereby claws or pins on the take-down member are moved into engagement with sprocket holes in the film, the take-down movement which is performed by a take-down member such as an arm or a claw carrying member and the register pin movement whereby pins or holding members are inserted into sprocket holes in the film to register the film with the frame and to hold the film in accurate registration during the exposure period. In order to produce the best results these functions should take place and be completed during the time the exposure aperture is closed. If either the register pins or the film engaging pins on the take-down member move in or out of the sprocket holes in the film during exposure, the film is subjected to disturbance. This is objectionable since the film may be moved relative to the plane of focus and the focus disturbed. In the camera embodied in this invention, we propose to provide a take-down arm, a take-down pin and a register pin assembly so correlated and synchronized as to operate within substantially a 160 degree closure period and in which there is no film disturbing movement in either the take-down pin or the register pins in the sprocket holes outside this period. In the preferred form of our invention the register pins are allowed to dwell during the full exposure period and the take-down pin does not disturb the film during this time, consequently there can be no sawing action of the pins in the sprocket holes and as a result there is no possibility of moving the film with respect to the focal plane or frame registration during exposure. This will be recognized as an improvement over other types of film moving mechanism wherein the film engaging claws or pins on the take-down member or the register pins are allowed to engage and slide through the sprocket holes during part of the exposure period.

It is another object of this invention to provide a camera having an intermittent movement comprising a take-down arm, a take-down pin and a register pin assembly wherein the movement of these members is uniformly accelerated and decelerated to minimize shock, decrease vibration and reduce strain in the film. As previously mentioned one of the objects of this invention is to provide a camera having a shutter opening up to substantially 200 degrees of shutter rotation. This means that the component functions of the take-down movement must take place within approximately 160 degrees of shutter rotation. In order to appreciate this it must be understood that the complete take-down movement of the present invention comprises the following functions: 1, at the beginning of the take-down cycle and slightly before the take-down arm reaches its uppermost position, the take-down pin starts moving in to a film engaging position; 2, as soon as the take-down pin engages the film in a sprocket hole, the register pins start withdrawing; 3, with the register pins in the clear, the take-down arm moves the film down one frame or as many frames as the movement is designed to move the film; 4, slightly before the end of the take-down stroke, the register pins start entering the sprocket holes; 5, as soon as the register pins engage the sprocket holes, the take-down pin starts withdrawing; 6, when the take-down pin is clear of the film, the take-down arm returns to the beginning of the cycle.

It will be noted in function 1 of the above that the take-down pin starts moving into a film engaging position before the take-down arm has finished its upward stroke. This much of the take-down pin movement occurs during the exposure period, but is not objectionable since the film is not engaged until the last instant of the exposure period and even then is held fixed by the register pins. As soon as the take-down pin engages the film, the register pins withdraw, leaving the film ready for the take-down movement. It will be seen that there is an interlocking relation between the register pins and the take-down pin at this point, and it is to be understood that a similar interlocking relation exists at the lower end of the take-down stroke. At the lower end of the stroke, the register pins start entering the sprocket holes before the film has stopped moving and come to a film engaging position as the take-down arm completes its stroke. The movement has been so designed that the take-down arm moves the film the exact distance necessary for framing with the result that the register pins are not required to move the film for framing. In addition, the take-down pin is vertically withdrawn from the film and accordingly leaves the film without any film disturbance. Consequently the exposure period may start at the end of the take-down stroke.

Upon analysis it will be found that the take-down stroke requires approximately 160 degrees of shutter rotation to move from the topmost position to the lowermost position and that the only pin movement outside this interval is as before stated, the initial movement of the take-down pin toward a film engaging position at the beginning of the cycle which as before explained is unobjectionable and the final withdrawal of the take-down pin from the sprocket hole which has also been pointed out as not causing any disturbance to the film. Obviously, then the entire take-down movement may be confined to 160 degrees of shutter rotation and conversely, the exposure period may extend up to 200 degrees of shutter rotation. In order to accomplish the foregoing, the register pins and the take-down pin must move with comparative rapidity, but these have been designed with a minimum of weight and may be moved with the necessary speed without undue vibration. The movement of the take-down arm as well as the take-down pin and the register pins has been carefully designed with a view to imparting uniform acceleration and deceleration to these parts to reduce shock, minimize vibration and decrease strain in the film. We produce this type of movement for the take-down arm by means of an eccentric and lever combination wherein ideal conditions exist for this purpose and although the closure period is less than that in ordinary cameras, the actual maximum velocity attained by the take-down arm is considerably less than that of present cameras due to the fact that the actual take-down movement of the arm is spread over a longer period of time. In effect, where the closure period exists during 160 degrees of shutter rotation, the film starts moving simultaneously with the closing of the aperture and continues moving during the full 160 degrees of closure. Under this arrangement, full advantage is taken of the entire closure period for moving the film with the result that although the closure period is comparatively short, an optimum is attained in the velocity of the film and the take-down arm. It is one of the features of our invention, that the foregoing is accomplished in conjunction with a decreased closure period.

The take-down pin and the register pins are actuated by separate cams which have been specially designed to transmit the required movement to their respective parts. By utilizing separate cams for each pin movement we are enabled to fix the movement of these pins in any way desired and are not dependent upon a translated component of the movement of the take-down arm for actuation of the pins. As before explained, the register pins are not required to move the film for frame registration but function more as a means for holding the film in accurate frame registration during the exposure period, consequently the movement may be operated satisfactorily for certain classes of work without the use of register pins. Also the movement may be reversed to feed film backward when required. In addition, a movement characterized by the foregoing features of design and arrangement of parts lends itself admirably for use in high speed work.

A further object of this invention is to provide a pressure pin arrangement for use in multiple film work. This pin may be arranged to operate in conjunction with the register pins and is for the purpose of overcoming the tendency of a plurality of films to separate over the exposure aperture.

Other objects and advantages will appear as the description proceeds in conjunction with the drawings in which.

Broadly speaking, the invention comprises three separate, synchronously actuated operating units, namely, the take-down arm, the take-down pin and the register pin assembly. The take-down arm is pivotally mounted at one end with the free end extending just short of engagement with the film and performs the take-down movement by an oscillation about the pivot. The oscillation of the take-down arm is accomplished by means of an eccentric coupled to a sliding member on the take-down arm intermediate the pivot point and the free end. It is to be understood that the take-down arm does not move longitudinally, the only movement being an oscillation about the fixed pivot. The take-down pin is a separate member, movably mounted in the take-down arm and arranged to be actuated by a separate continuous contact cam. With this construction the take-down pin may be small and light and being in constant contact with the cam provides a means toward noise reduction in the movement. The register pin assembly is a separate unit and depends on a separate cam for its operation. Essentially, the three movements are distinct and the extent and timing of each movement is independent of the others since none of the movements is a multiple of any component of either of the other movements. The whole assembly may be mounted upon one shaft and forms a compact, sturdy, durable unit.

Figure 1:
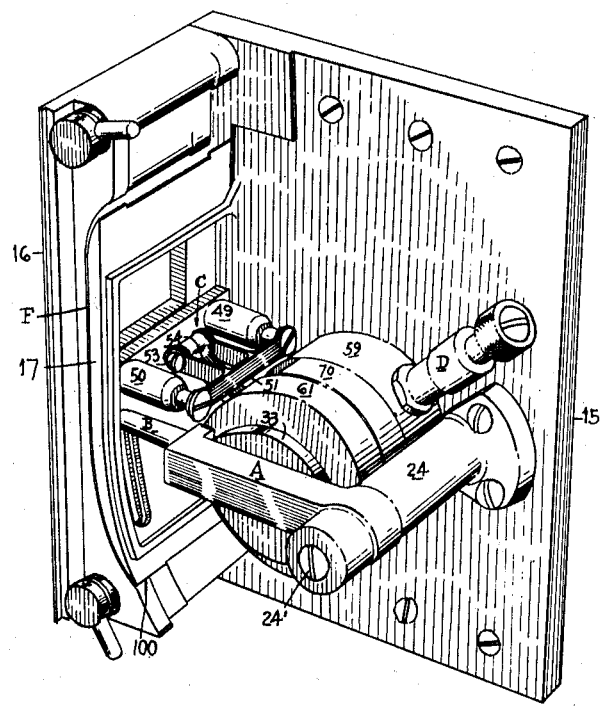
Figure 1 is a perspective view of the movement, with the cover removed, as it would be installed in a camera.
Figure 2:
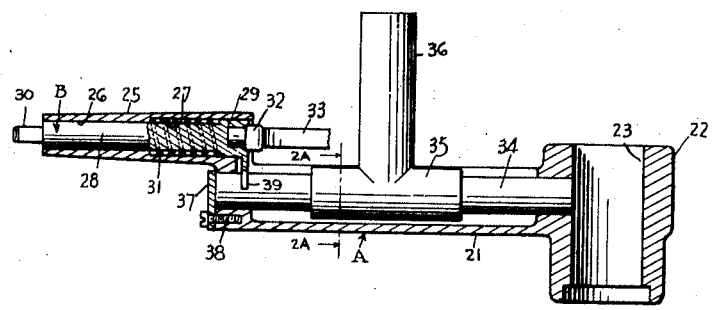
Figure 2 is an enlarged sectional view of the take-down arm.
Figure 3:
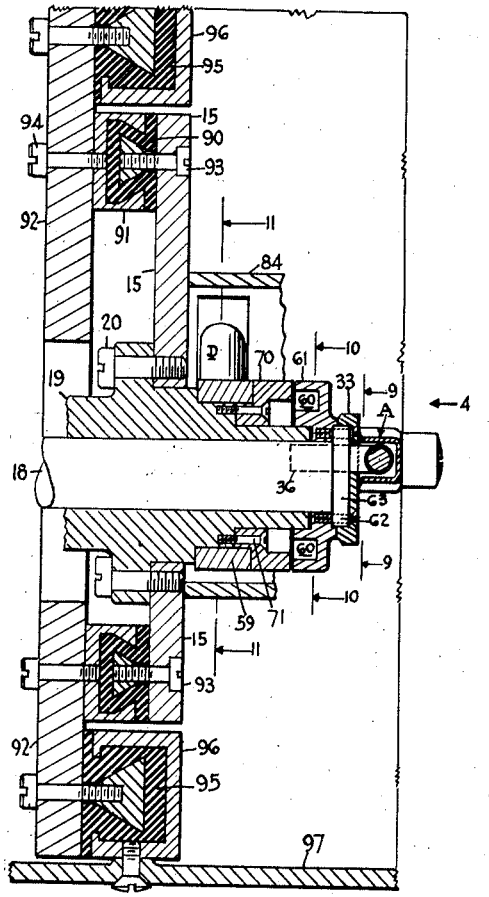
Figure 3 is a vertical section of the movement, taken on the line 3—3 of Figure 4 showing the novel manner of mounting the movement in a camera case.
Figure 4:
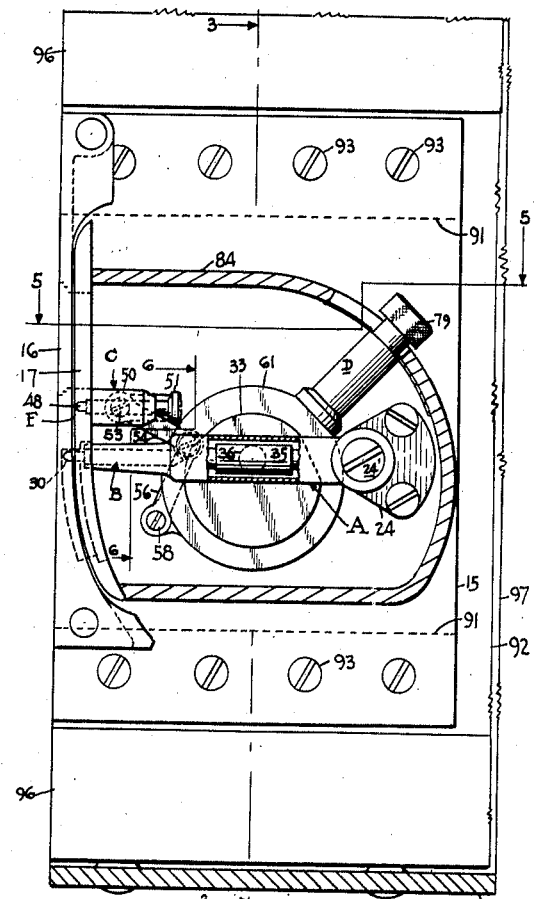
Figure 4 is a view of the movement taken in the direction of the arrow in Figure 4.
Figure 5:
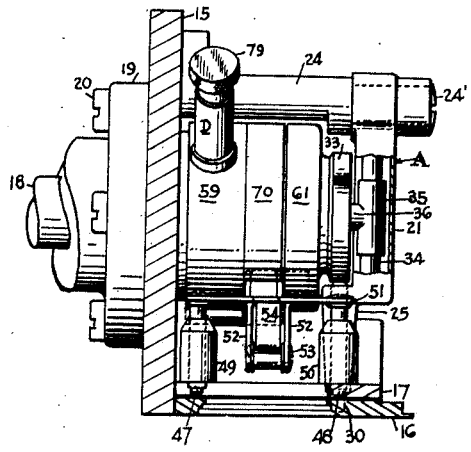
Figure 5 is a top plan partly in section, taken on the line 5—5 of Figure 4.

Referring more specifically to the drawings, and particularly to Figures 1 and 2, it will be noted that we have generally designated the take-down arm A, the take-down pin by the letter B, and the register pin assembly by C. The whole assembly is mounted upon a plate 15 which, in turn, is suitably mounted in a camera case in a manner to be more specifically described hereinafter. The plate 15 also carries a front plate 16 and a back plate 17 with a film chute F therebetween. Referring now to Figure 3, it will be observed that the beforementioned parts are carried on a shaft 18 which, in turn, is journalled in a hub 19, supported on the plate 15 by any suitable means such as cap screws 20.

Figure 2A:
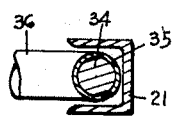
Figure 2a is a transverse section of the take-down arm taken on line 2a—2a of Figure 2.
Figure 9:
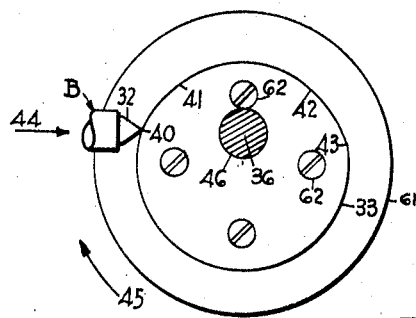
Figure 9 is a fragmentary view taken on line 9—9 of Figure 3.

In Figure 2 we have shown an enlarged transverse sectional view of the take-down arm. Here it will be observed that the arm comprises a body member 21 having a hub 22 at one end thereof, said hub being bored as shown at 23 to rotatably receive the end of a pin 24 mounted on the plate 15. The arm is retained on the pin 24 by any suitable means such as a screw 24'. The arm A is offset to form a portion 25 for mounting the take-down pin B. As shown in this view, the offset portion 25 is made with a bore 26 at one end and a counterbore 27 at the opposite end. The take-down pin B comprises a shank 28 adapted to fit in the bore 26 and an enlarged head 29 adapted to fit in the counterbore 27. The pin B may be shaped as shown to provide a film engaging portion 30 for entering the sprocket holes in the film. Mounted in the counterbore 27 is a spring member 31 which bears against the head 29 of the pin B and exerts a force tending to retract the point 30 within the portion 25. On the opposite end of the pin B we insert a member 32 which may be of any suitable material particularly adapted to form a serviceable sliding contact and operate noiselessly. The member 32 is arranged to operate as a follower on a cam 33 which will be more specifically described in the following description. As previously stated, the arm A is oscillated about the pivot represented by the pin 24 by means of an eccentric. For this purpose we shape the arm A between the pivot point and the offset portion as shown in the cross sectional view of Figure 2a. In this view it will be observed that the body portion 21 of the arm is channel shaped. In the channel portion of the arm we mount a rod 34 and upon this rod we arrange a sliding sleeve 35 which carries a stub shaft 36. The shaft is for the purpose of engaging an eccentrically positioned pivot hole in a rotating member. The rod 34 may be retained in place by any satisfactory means, in this instance we have shown a plate 37 extending over the end of the rod and attached to the arm by means of a cap screw 38. In order to prevent turning of the pin B and thus disturb the orientation of the film engaging portion 30 and also the cam engaging member 32, we form a yoke 39 which in this instance is a part of the pin B and extends up to and slidably engages a part of the circumference of the rod 34. By referring to Figure 9 it will be seen that the cam 33 and the follower 32 of the pin B are in constant engagement; also in this view the relation of the eccentric for imparting oscillation to the take-down arm to the movement of the take-down pin can be observed. This relation will be explained later. The cam 33 is an open face cam formed with two ramps extending between the points 40—41 and 42—43.

It is to be understood that the cam rotates in the direction of the arrow 45. Between the points 40 and 43 the cam is more or less uniform and the rotation of the cam between these points represents the take-down movement. From point 43 to 42 the ramp extends downwardly, that is, the point 32 is allowed to travel inwardly in the direction of the arrow 44 which retracts the film engaging portion 30 from the film engaging position. From the point 42 to 41 the cam is again approximately uniform. This distance represents the return of the take-down arm from the lowermost point in the take-down movement to the upper point of the movement for the beginning of a new cycle of operation. From 41 to 40 the ramp is increasing and operates to push the follower 32 outwardly which forces the portion 30 of the pin B into a film engaging position. The arm at this point is ready to function again in a take-down movement and is in the position shown in Figure 9. The eccentric which operates the sliding sleeve 35 on the rod 34 of the arm A is designated by the hole 46 in the shaft 18 and the cam 33 into which the shaft 36 extends. It is to be understood that the hole 36 rotates with the cam 33 and that the cam 33 is attached to the shaft 18 by means which will be discussed in connection with the register pin assembly. A novel combination of movements resides in the above described arrangement. By referring to Figures 7 and 8, it will be seen that as the take-down arm moves downwardly in a take-down movement, the take-down pin with the follower 32 moves against rotation of the cam 33, whereas in the upward movement of the take-down arm, the take-down pin moves with the rotation of the cam 33.

Figure 10:
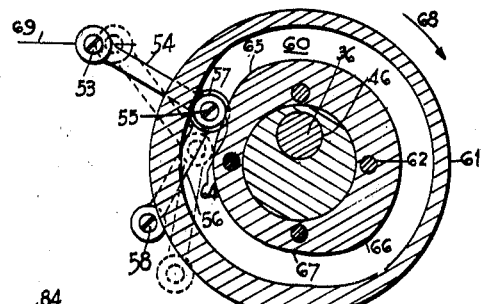
Figure 10 is a section taken on line 10—10 of Figure 3.

The register pin assembly consists of two pins 47 and 48 arranged to engage sprocket holes in the film and as is well known, are for the purpose of registering the film for each frame. These pins are variously known as holding pins or locking pins, but for the purpose of this description will be termed register pins. The pins are mounted in guide members 49 and 50 respectively, which members in turn are mounted on the back plate 17. The inner ends of the pins are connected by a cross member 51 which, in turn, is provided with a yoke 52 adapted to receive a pin 53 at the outer end thereof. Referring now to Figure 10 a more detailed description of the cam actuating unit in combination with the linkage control will be entered. Here it will be noted that the pin 53 carries a link 54 which extends inwardly therefrom and carries a pin 55 on the inward end. The pin 55 in turn forms a pivot for a second lever 56 and a mounting for a roller 57. The lower end of the lever 56 is pivotally mounted on a pin 58 which pin, in turn, is supported on a member 59. The member 59 will be more fully described hereinafter. The roller 57 on the pin 55 is arranged to extend into a scroll cam 60, said cam being cut in a member 61. By referring to Figure 3, it will be seen that the member 61 is mounted on the shaft 18 by means of screws 62 extending through the cam 33 and a flange 63 on the shaft 18 and into the body part of the member 61. With this arrangement the cam 33 and the member 61 are adapted to rotate with the shaft 18. In Figure 10 an enlarged sectional view of the member 61 showing the cam 60 is illustrated. In this view the cam 60 will be noted to have a low point 64 connected to a high point 65 by an ascending ramp and a second high point 66 connected to a second low point 67 by a descending ramp. The member 61 rotates in the direction of the arrow 68. Between the low points 64 and 67 there is a substantially uniform circumference and between the points 66 and 65 there is also a substantially uniform circumference. As the cam rotates in the direction of the arrow 68, the roller 57 follows the above described path of the cam and in so doing oscillates the link 56 about the pivot 58 due to the roller passing over the high and low points of the cam. This movement will, in turn, be transmitted to the pivot 53 which, as before described, is a pivot point on the register pin assembly. The register pins due to the guide members 49 and 50 are forced to follow a path designated by the line 69, said line being substantially perpendicular to the plane of the film at that point. In a cam of this arrangement the design of the cam may be such that any amount of movement with a predetermined timing may be imparted to the pins as desired. The relation of the ramps of the cams 33 and 60 with respect to time will be described later.

Figure 6:
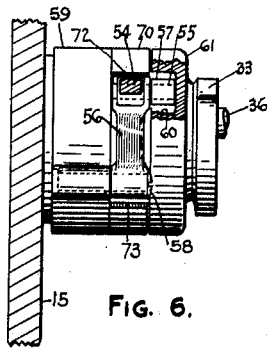
Figure 6 is a side elevation, partly in section, taken on line 6—6 of Figure 4.
Figure 11:
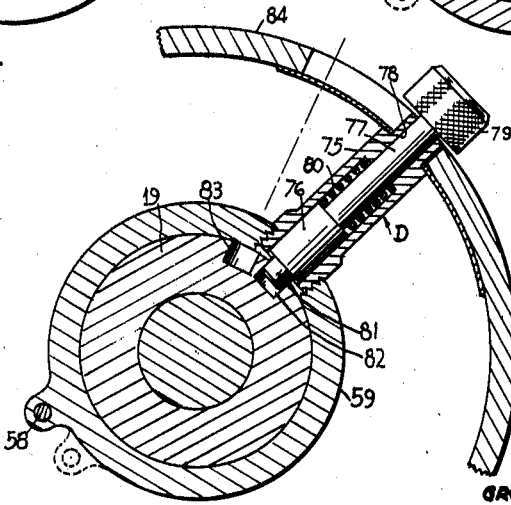
Figure 11 is a section taken on line 11—11 of Figure 3.

Referring now to member 59 which carries the pivot point 58 of the link 56, it will be seen in Figures 3 and 11 particularly that this member is movably mounted upon the hub 19 and held in place thereon by a spacer 70, said spacer in turn being attached to the hub 19 by screw 71. The spacer 70 has a segment cut away between the points 72 and 73 (see Fig. 6) to permit the entrance of the links 54 and 56 between the members 59 and 61 and the movement of the roller 57 in the cam 60. The purpose of movably mounting the member 59 on the hub 19 is to permit turning of the member 59 so as to withdraw the register pins for threading film through the movement. In Figure 11 we have shown an enlarged cross-sectional view of the member 59 illustrating mechanism for turning the member 59 on the hub 19. This mechanism comprises a detent arrangement generally designated D. As shown, this arrangement comprises a body 75 counterbored to receive a plunger 76 having a pin 77 thereon extending through a bore 78 and terminating in a head 79. A spring 80 is inserted behind the plunger 76 and exerts a pressure normally tending to push a pin 81 on the plunger 76 into a hole 82 in the member 19. When the pin 81 is in this position the pivot 58 is in such position that the roller 57 operating through the cam 60 will work the register pins 47 and 48 into and out of engagement with the sprocket holes in the film. When the pin 81 is thrown over into the hole 83, the pivot point 58 is swung into the dotted line position and since the link 56 connects the pivot point 58 to the roller 57, the roller 57 is carried down the cam 60 in such a manner that the angular relation of the pivot points 53, 55 and 58 is changed, which results in a retraction of the pivot point 53 thus holding the register pins in an inoperative position. In this position the film may be threaded and the movement may be actually operated with the register pins in this position. In practice, the movement would be housed in a cover 84 which would be suitably mounted on the plate 15. The head 79 of the detent arrangement D would extend through the cover into a manually accessible position.

Figure 7:
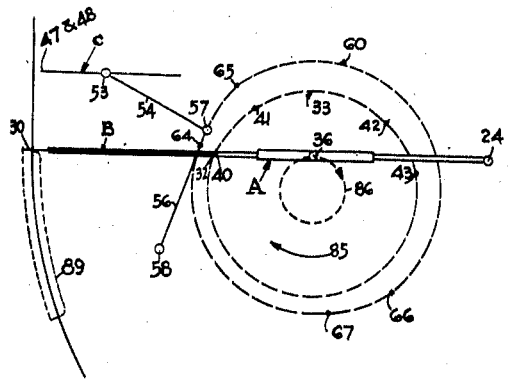
Figure 7 is a diagrammatic layout of the separate movements of the various parts showing their synchronous relation at the beginning of the cycle of the take-down movement.
Figure 8:
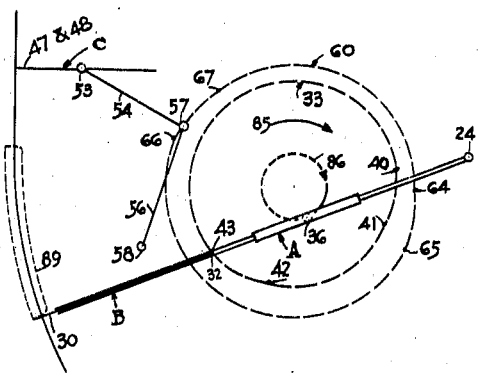
Figure 8 is a view similar to Figure 7, showing the position of the parts at the end of the take-down movement.

Referring to Figures 7 and 8, a diagrammatic layout of the three movements involved in the mechanism is shown. In these views the same numbers will be used to designate the parts of the movement hereinbefore described. In Figure 7 the take-down arm A is set at the beginning of the cycle of a take-down movement. In this position the eccentric pivot on the shaft 18 which has been designated by the shaft 36 working into the hole 46 is in the topmost position for movement of the arm A. The direction of rotation is in the direction of the arrow 85 and the pivot point 36 follows the dotted line path designated 86. The path of the cam 33 has been designated by dotted line 33 and the path of the cam 60 has been shown in dotted lines designated 60. The same numbers representing the high and low points of each cam in Figures 9 and 10 have been used to designate like points in Figures 7 and 8. In order to give a complete understanding of the movement one cycle of intermittent motion will be described. With the arm A in the position shown in Figure 7, and the pivot point 36 in the position shown, the take-down pin B has entered a full film engaging position due to the fact that the cam 33 has moved the follower 32 of the pin B up the ramp from the point 41 to point 40. At this point it will be observed that the roller 57 has moved on the cam 60 down the ramp from point 65 toward point 64. It will be noted that the roller 57 has not completely finished its downward movement, whereas the take-down pin B is in the full film engaging position. In Figure 8 the take-down arm is shown at the completion of the take-down movement, and it will be observed that the high point 43 of the cam 33 is directly under the follower 32. Also at this point it will be noted the roller 57 has passed the low point 67 on the cam 60 and is partially up the ramp on the way to the high point 66. As the shaft 18 continues to rotate, the follower 32 slides down the ramp from the high point 43 to low point 42 and retracts the point 30 from the film engaging positions. However, before the point 30 disengages the film the pins 47 and 48 engage the film and serve to hold it in a registered position. With the arrangement of the cams just described there is brought about an interlocking relation between the take-down pin and the register pins which means that the film is engaged at all times by either the take-down pin or the register pins. The cam 33 has been so designed that a point taken on the film engaging portion 30 of the pin B will travel substantially the dotted line path shown and designated 89. This path will be noted to approach perfection in that all transverse movement of the pin with respect to the film is substantially perpendicular to the film.

As previously mentioned, it is one of the objects of this invention to provide a motion picture camera wherein the noise level has been reduced. As a means towards this end we have developed a movement mechanism particularly adapted to operate with a minimum of vibration and noise, but in order to achieve a maximum reduction in noise we have developed a mounting having several novel features therein. In the mounting employed by us we reduce frequency vibration of the audible range to a sub-audible range by damping out some vibrations and lowering the frequency of others. We accomplish this by using rubber as an insulating medium between parts which may tend to vibrate. This feature is illustrated in Figure 3. Here it will be seen that the plate 15 is mounted upon rubber members 90, which in turn are carried by members 91 that are mounted upon a plate 92. The means of mounting may take any suitable form such as screws 93 and 94. It is to be understood that there may be a plurality of such members suitably and conveniently placed with respect to the type of mounting desired or required. The plate 92 is, in turn, mounted on a rubber member 95 that is supported by another member 96, said member being attached to a camera case 97 fragmentarily shown. With this type of mounting any vibration that may be set up by the intermittent movement mechanism must be transmitted to the member 92, through the rubber insulation 90. It is a known fact that a certain percentage of vibration will be transmitted through rubber insulation. However, we mount the plate 15 upon a plate 92 which is of considerably more mass than the plate 15 with the result that although some vibrations may be transmitted to the plate 92, the plate 92 being of such mass will respond only to its own normal period of resonance which will be of the sub-audible order. Inasmuch as the plate 92 will respond only to a sub-audible frequency and the plate 92 is in turn insulatively mounted on the camera case 97, it will be readily understood that any vibration produced by the mechanism will be materially reduced and become unobjectionable.

In operation the camera may be threaded with film by moving the detent arrangement D forward to the dotted line shown in Figure 11. This will retract the register pins into an inoperative position. Then by threading the film through the chute F and aligning a sprocket hole of the film with any suitable index mark such as the bottom of the back plate indicated at 100 in Figure 1, the film may be framed so that the take-down pin will engage a sprocket hole. The register pins are then inserted by moving the detent arrangement back into its normal operative position. The camera is then ready for shooting.

Figure 12:
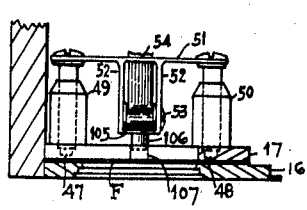
Figure 12 is a fragmentary view of the register pins showing a pressure pin in conjunction therewith.

The film moving mechanism described in the foregoing may be used in cameras, projectors and printers with slight modification. For special work it is often necessary to run two or more films at the same time past the exposure aperture. One of the difficulties in doing this arises out of the fact that the films tend to separate over the exposure aperture. In order to overcome this we have provided a pressure pin on the register pin assembly that is arranged to engage and press the films together during the exposure period at a point as near the exposure aperture as possible. Figure 12 shows a fragmentary view of the register pins with a pressure pin incorporated therewith. In this view the same numbers have been used to designate the same parts as hereinbefore described. It is to be understood that the pressure pin arrangement may take a variety of forms and that the arrangement shown and described is only one form that may be used in our invention. In Figure 12 it will be observed that the pressure pin assembly comprises the bridge 51 having extending arms 52. Across the outer ends of the arms 52 we form a cross member 105 and in this member we mount a pin 106. The pin 106 is arranged to extend into a hole 107 in the back plate 17. As the register pins are worked into and out of engagement with the film by means of the mechanism hereinbefore described, the pressure pin also works against the middle surface of the film. In practice the pin 106 is exactly long enough to engage the films and bring sufficient pressure on the films to hold them in close contact while the register pins hold the films in exact registration with the frame. There may be one or more of these pins as desired or found necessary. A pressure pin arrangement of this nature may be used to good advantage in printing multiple films or in any other intermittent film moving mechanism where a plurality of films is used.

Although we have shown and described a specific form of our invention, we do not want to limit the invention to the exact form shown, but intend the illustration and the description to cover all forms that come within the scope of the disclosure and the essence of the invention as expressed in the appended claims.

We claim:

1. In a camera of the character described a film moving mechanism comprising: a take-down arm pivotally mounted at one end thereof with the free end extending short of engagement with the film; a slideway on said arm intermediate the pivot point and the free end thereof; a sliding member on said slideway; a drive shaft having an eccentric pivot thereon connected to said sliding member; a cam mounted on said shaft and adapted to rotate therewith and a take-down pin slidably mounted in the free end of said arm and adapted to engage said cam to be moved into and out of a film engaging position.

2. In a camera of the character described, a film moving mechanism comprising: a take-down arm arranged to oscillate about a fixed pivot; a take-down pin movably mounted on said take-down arm in a film engageable position; a revolvable cam adapted to work said pin into and out of engagement with the film in synchronous relation with the oscillation of said arm; register pins adapted to be moved into a film holding position in timed relation to the movement of said take-down pin; means for moving said register pins, said means including a scroll cam arranged to be rotated in synchronous relation with the oscillation of said arm, a follower for said cam, a first link pivotally mounted at one end thereof on a fixed pivot, a second link pivotally connected at one end to the free end of said first mentioned link and having the opposite end pivotally connected to said register pins with said follower being mounted on the pivotal connection between the two said links.

3. The structure as set forth in claim 2 wherein means is included for moving the fixed pivot of said first link to move said register pins into an inoperative position.

4. In a camera of the character described a film moving mechanism comprising: a take-down arm pivotally mounted at one end thereof; a rotatable drive shaft having an eccentric pivot thereon; a sliding member on said arm operably connected to said eccentric pivot to oscillate said arm about its pivot point upon rotation of said shaft; a take-down pin slidably mounted on said arm; an open faced cam mounted on said shaft and arranged to move said pin into and out of a film engaging position in timed relation to the movement of said arm.

5. For use with an intermittent film moving mechanism a register pin assembly comprising: register pins adapted to be moved into a film holding position; means for moving said pins in synchronous relation to the intermittent movement of said film, said means including a first link having one end pivotally connected to said pins, a second link having one end pivotally mounted on a fixed pivot, said links having their opposite ends pivotally interconnected, a rotatable cam and a follower for said cam mounted on the interconnection between the two said links.

6. A structure as set forth in claim 5 and in addition thereto means for moving the fixed pivot of said second link to move said pins into an inoperative position.

7. For use with an intermittent film moving mechanism, a register pin assembly comprising: register pins adapted to be moved into a film holding position; means for moving said pins in synchronous relation to the intermittent movement of said film, said means including a first link having one end pivotally connected to said pins, a second link having one end pivotally mounted on a fixed pivot, said links having their opposite ends pivotally interconnected, a supporting hub, a rotatable shaft in said hub, a cam on said shaft, a follower for said cam mounted on the pivotal interconnection between the two said links, a movable ring mounted on said hub and having said fixed pivot thereon and a detent arrangement for holding said ring in predetermined fixed positions.

8. In a camera of the character described, a film moving mechanism comprising: a take-down arm arranged to oscillate about a fixed pivot; a take-down pin movably mounted on said take-down arm in a film engageable position; a revolvable cam adapted to work said pin into and out of engagement with the film in synchronous relation with the oscillation of the said arm; register pins adapted to be moved into a film holding position in timed relation to the movement of said take-down pin; means for moving said register pins; said means including a scroll cam arranged to be rotated in synchronous relation with the oscillation of said arm, a follower for said cam, a first link pivotally mounted at one end thereof on a fixed pivot, a second link pivotally connected at one end to the free end of said first mentioned link and having the opposite end pivotally connected to said register pins with said follower being mounted on the pivotal connection between the two said links; and means for moving the fixed pivot point of said first link to move said register pins into an inoperative position; said last mentioned means including a ring rotatable relative to said scroll cam and having the fixed pivot of said first link thereon.

9. A structure as set forth in claim 8 wherein a detent arrangement is included for holding said ring in predetermined fixed positions.

10. For use with an intermittent film moving mechanism, a register pin assembly comprising: register pins adapted to be moved into a film holding position; means for moving said pins in synchronous relation to the intermittent movement of said film, said means including a first link having one end pivotally connected to said pins; a second link having one end pivotally mounted on a fixed pivot, said links having their opposite ends pivotally interconnected; a rotatable cam; a follower for said cam mounted on the interconnection between the two said links; and a ring rotatable relative to said cam having said fixed pivot thereon.

GROVER LAUBE.
ROBERT COLBY STEVENS.
CHARLES MELVIN MILLER.